United States Patent
Hahn et al.

(10) Patent No.: US 11,140,732 B2
(45) Date of Patent: Oct. 5, 2021

(54) METHOD FOR PERFORMING SIDELINK COMMUNICATION IN WIRELESS COMMUNICATION SYSTEM AND APPARATUS THEREFOR

(71) Applicant: LG Electronics Inc., Seoul (KR)

(72) Inventors: Genebeck Hahn, Seoul (KR); Jaewook Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/500,263

(22) PCT Filed: Nov. 23, 2017

(86) PCT No.: PCT/KR2017/013426
§ 371 (c)(1),
(2) Date: Oct. 2, 2019

(87) PCT Pub. No.: WO2018/186552
PCT Pub. Date: Oct. 11, 2018

(65) Prior Publication Data
US 2020/0077460 A1 Mar. 5, 2020

Related U.S. Application Data

(60) Provisional application No. 62/480,508, filed on Apr. 2, 2017.

(51) Int. Cl.
*H04W 76/15* (2018.01)
*H04W 76/14* (2018.01)
(Continued)

(52) U.S. Cl.
CPC ......... *H04W 76/15* (2018.02); *H04W 72/042* (2013.01); *H04W 76/14* (2018.02);
(Continued)

(58) Field of Classification Search
CPC ..... H04W 76/15; H04W 76/14; H04W 76/27; H04W 72/042; H04W 88/04; H04W 80/00; H04W 80/02; H04W 84/18; H04W 92/18
See application file for complete search history.

(56) References Cited

U.S. PATENT DOCUMENTS

2013/0301438 A1* 11/2013 Li ........................... H04L 5/001
370/252
2016/0021649 A1* 1/2016 Zisimopoulos ....... H04W 76/23
370/329
(Continued)

FOREIGN PATENT DOCUMENTS

WO WO2016182597 11/2016
WO WO2017052342 3/2017

OTHER PUBLICATIONS

3rd Generation Partnership Project; Technical Specification Group Radio Access Network; "Evolved Universal Terrestrial Radio Access (E-UTRA); Radio Resource Control (RRC); Protocol specification (Release 14)," 3GPP TS 36.331 V14.2.0, dated Mar. 2017, 723 pages.

(Continued)

*Primary Examiner* — Harry H Kim
(74) *Attorney, Agent, or Firm* — Fish & Richardson P.C.

(57) ABSTRACT

A method for performing a sidelink communication through a terminal-to-network relay operation is disclosed. The method performed by a first user equipment (UE) includes transmitting, to a base station, a control message including indication information indicating whether a radio access technology (RAT) type of a radio interface section with a second UE is a 3GPP access or a non-3GPP access; receiving, from the base station, a radio resource for transmitting and receiving a signal with the second UE through the radio interface section; and transmitting and receiving the signal with the second UE based on the received radio resource.

8 Claims, 9 Drawing Sheets

(51) Int. Cl.
*H04W 76/27* (2018.01)
*H04W 72/04* (2009.01)
*H04W 88/04* (2009.01)
*H04W 80/00* (2009.01)
*H04W 92/18* (2009.01)

(52) U.S. Cl.
CPC ........... *H04W 76/27* (2018.02); *H04W 88/04* (2013.01); *H04W 80/00* (2013.01)

(56) References Cited

U.S. PATENT DOCUMENTS

| | | | |
|---|---|---|---|
| 2018/0199388 A1* | 7/2018 | Tabet | H04W 72/0446 |
| 2019/0045574 A1* | 2/2019 | Feng | H04B 7/155 |
| 2019/0357101 A1* | 11/2019 | Stojanovski | H04W 36/0022 |
| 2019/0357284 A1* | 11/2019 | Xu | H04B 17/318 |

OTHER PUBLICATIONS

ASUSTeK, "Discussion on connection setup for FeD2D," R2-165285, 3GPP TSG-RAN WG2 Meeting #95, Göteborg, Sweden, Aug. 22-26, 2016, 5 pages.

Intel Corporation, "TP for additional scenario in FeD2D," R2-1701310, 3GPP TSG RAN WG2 Meeting #97, Athens, Greece, Feb. 13-17, 2017, 4 pages.

\* cited by examiner

[FIG. 1]
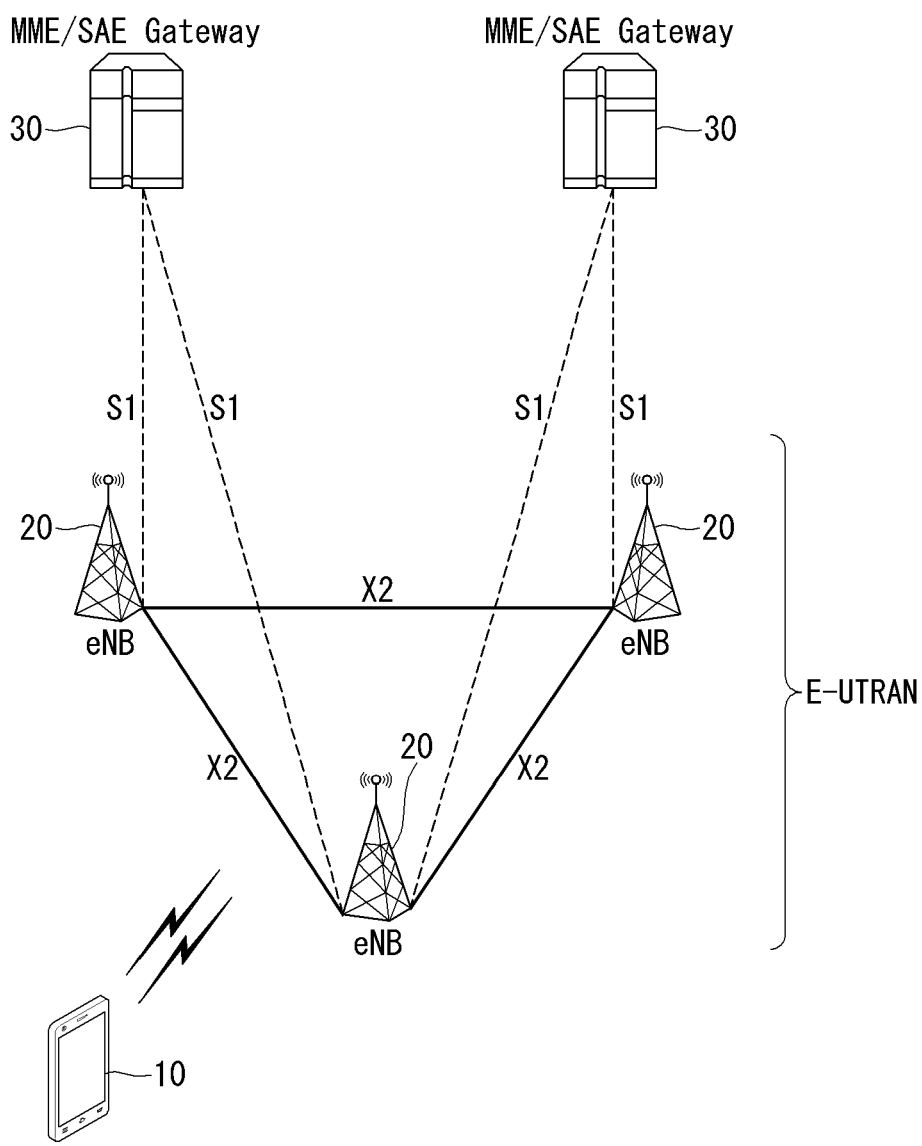

[FIG. 2]
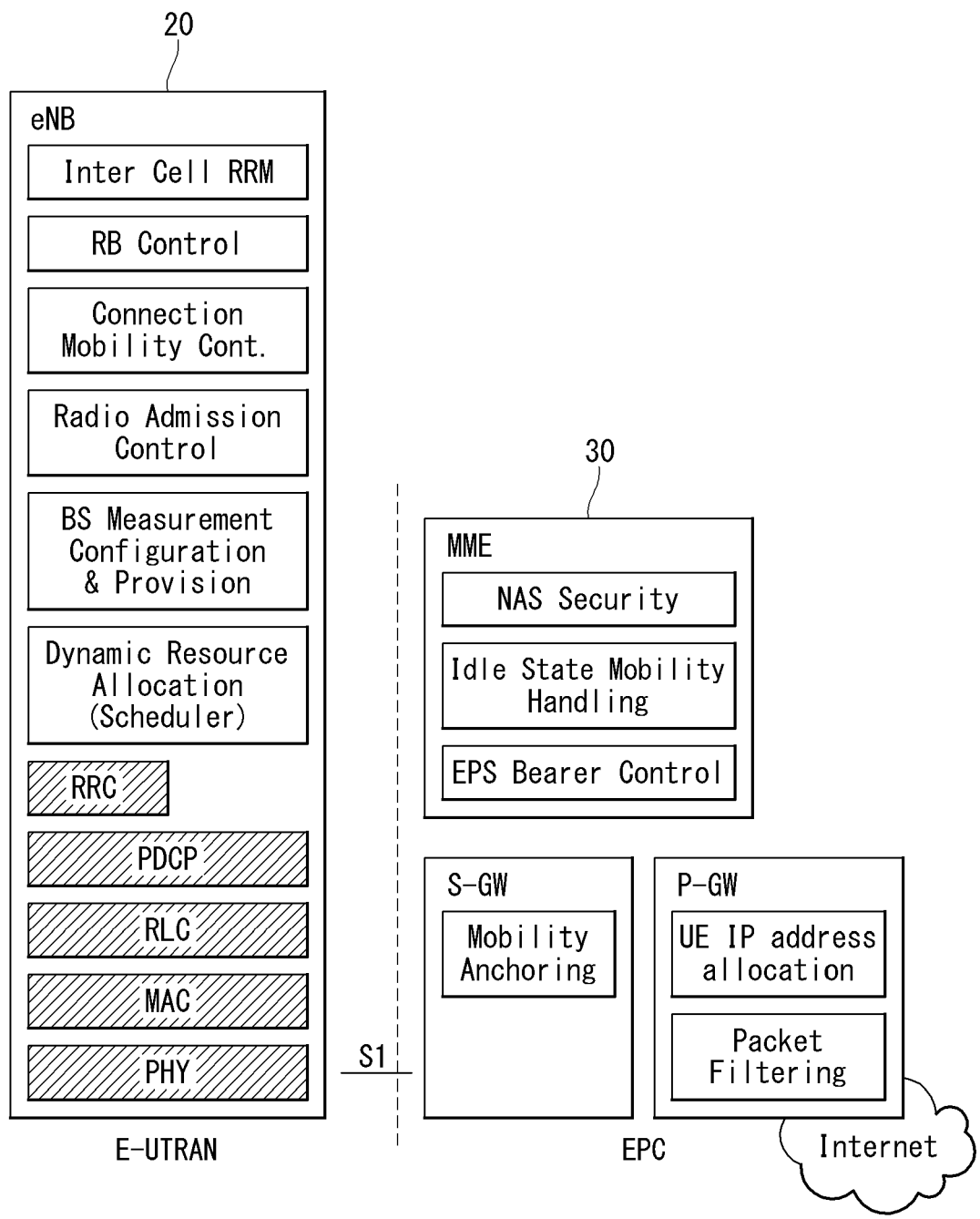

【FIG. 3】
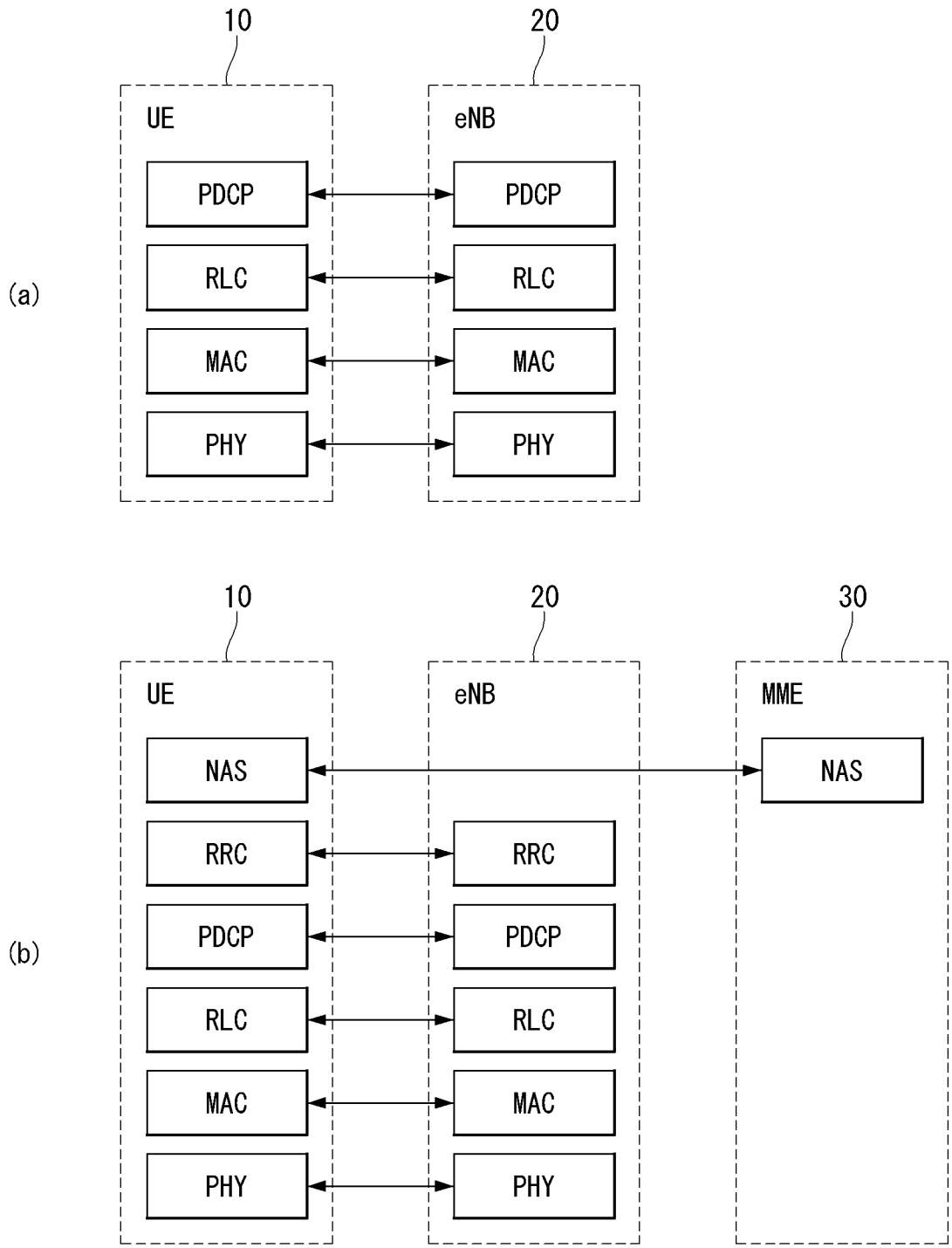

[FIG. 4]
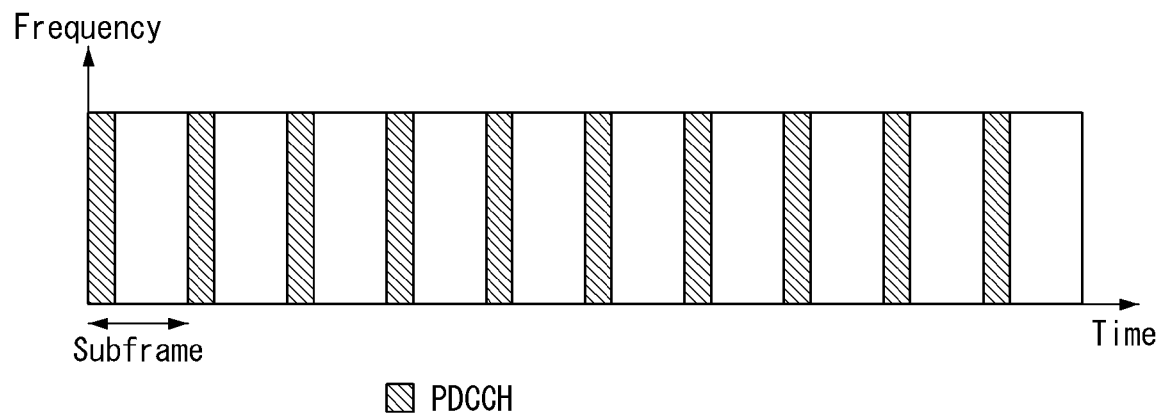
[FIG. 5]
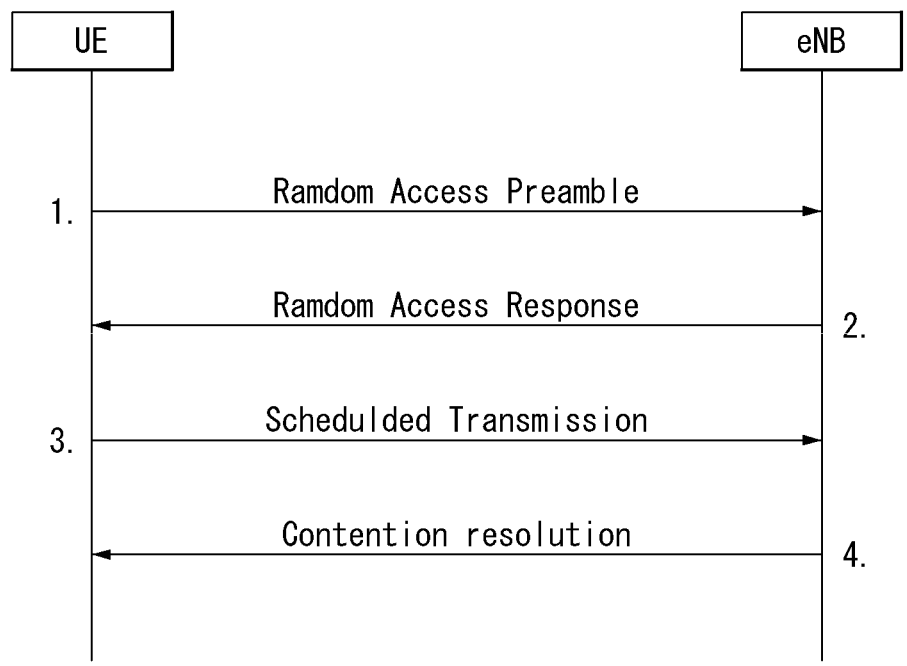

[FIG. 6]
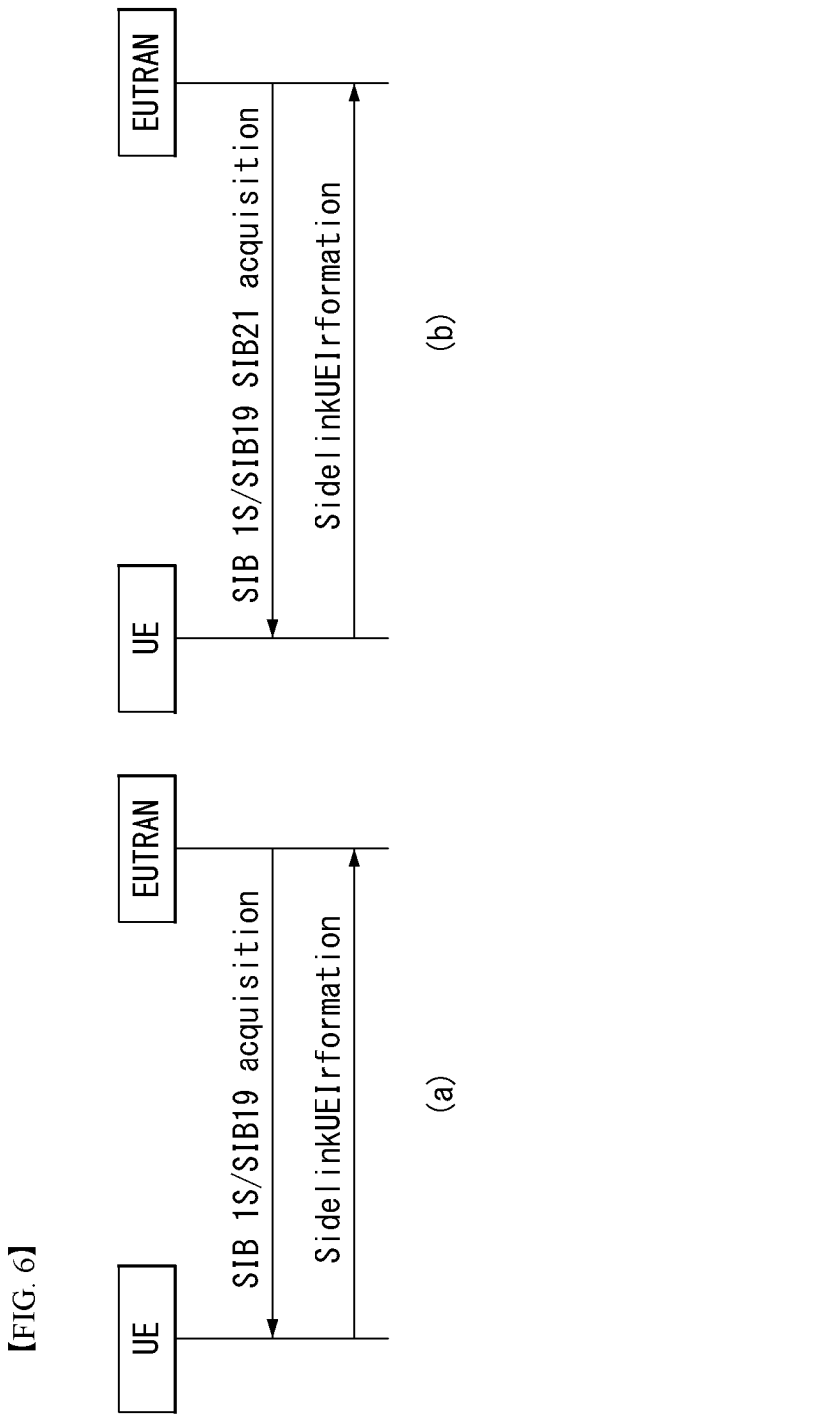

[FIG. 7]
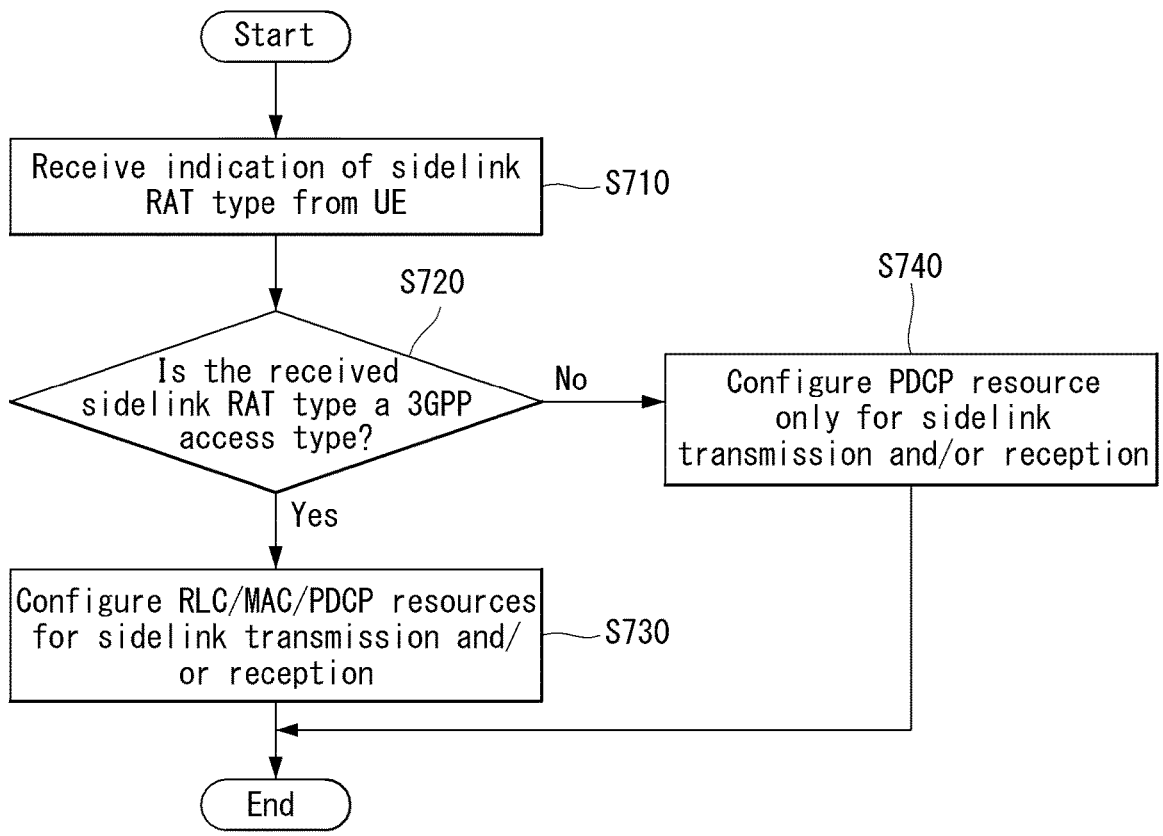

[FIG. 8]
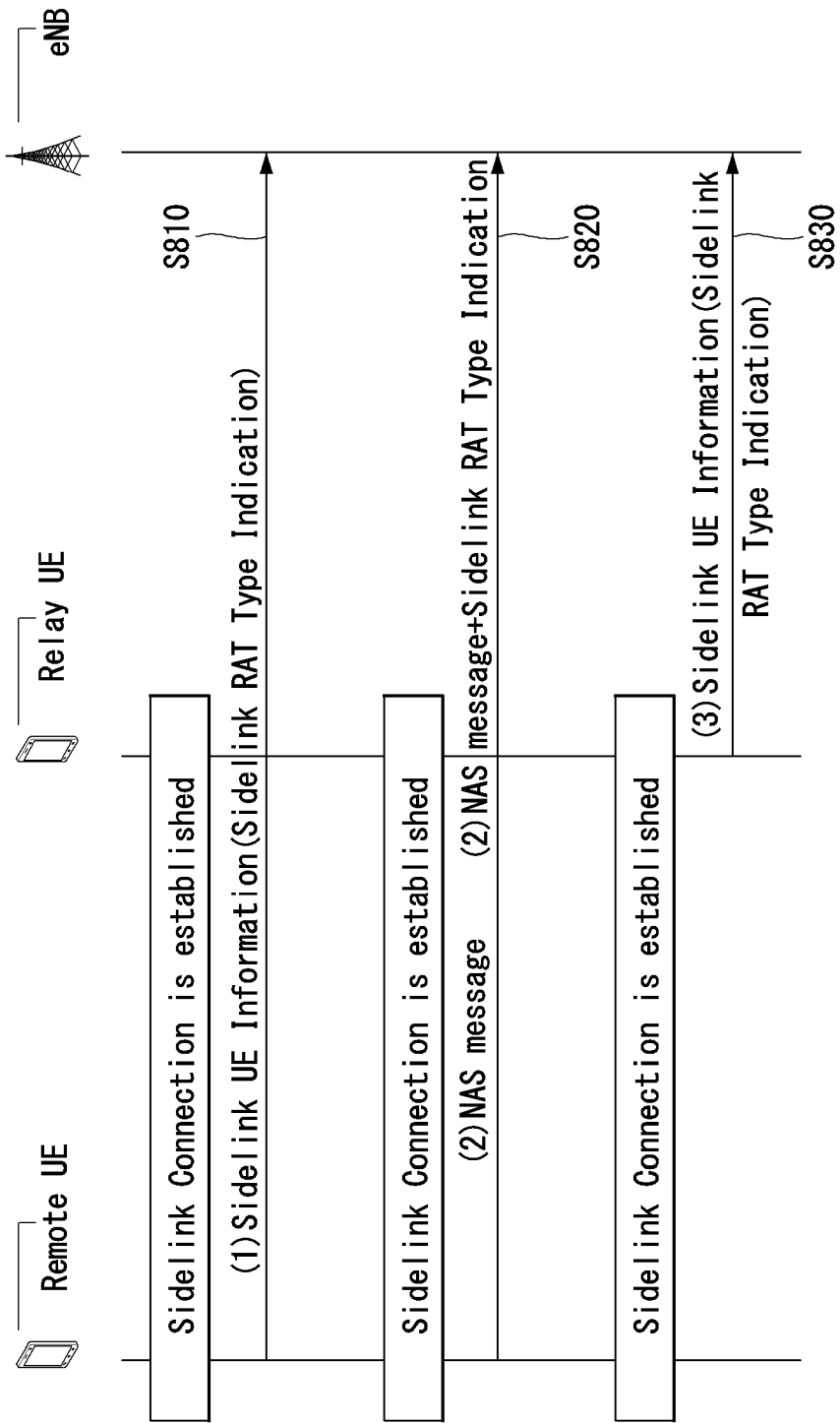

[FIG. 9]
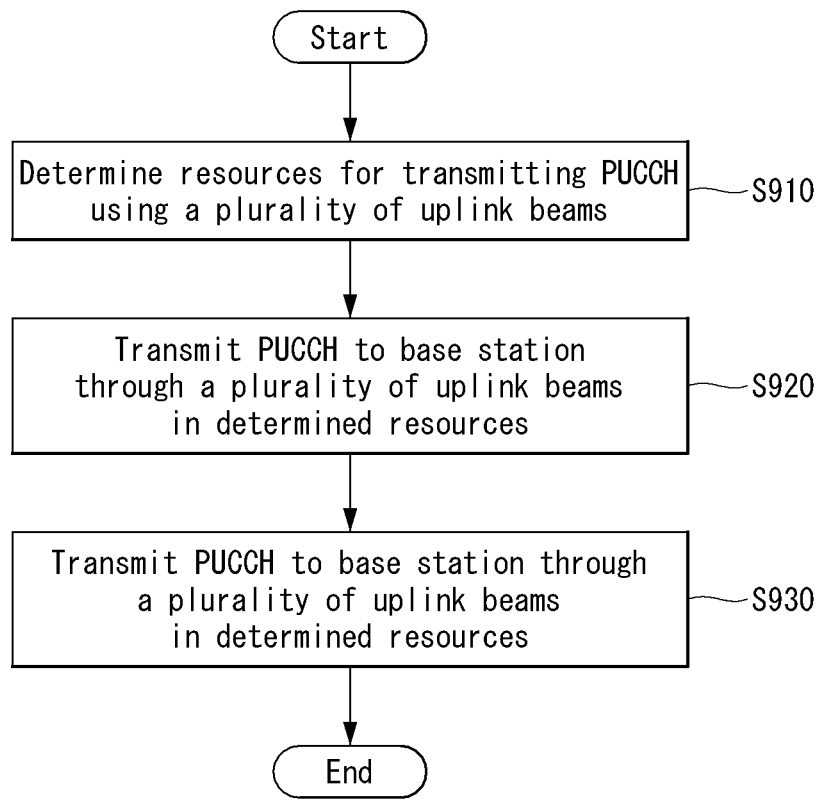
[FIG. 10]
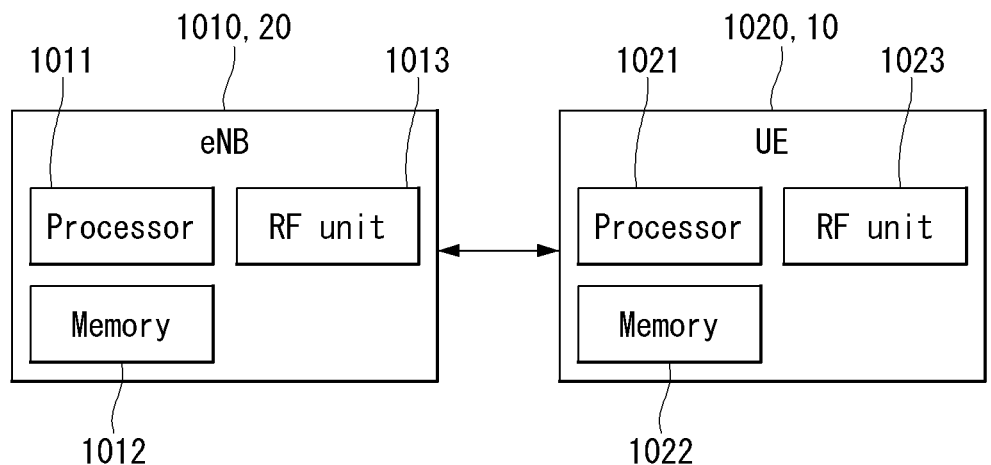

[FIG. 11]
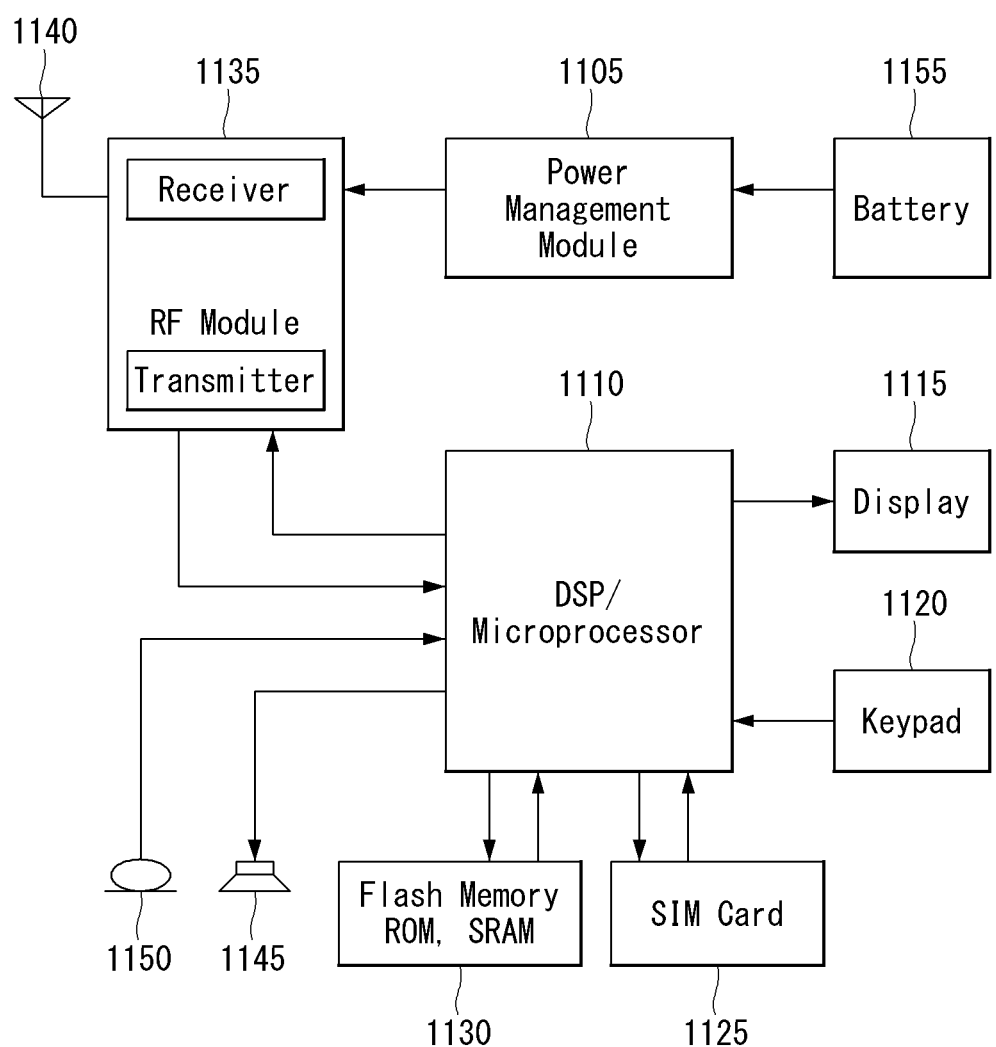

METHOD FOR PERFORMING SIDELINK COMMUNICATION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2017/013426, filed on Nov. 23, 2017, which claims the benefit of U.S. Provisional Application No. 62/480,508, filed on Apr. 2, 2017. The disclosures of the prior applications are incorporated by reference in their entirety.

TECHNICAL FIELD

The present disclosure relates to a wireless communication system, and more particularly to a method for performing a sidelink communication and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present disclosure is to provide a method for informing a base station of an indication of a sidelink RAT type of a sidelink section.

Another object of the present disclosure is to provide a method for configuring a resource for sidelink transmission and/or reception to a user equipment (UE) based on an indication of a sidelink RAT type.

Technical problems to be solved by the present disclosure are not limited by the technical problems mentioned above, and other technical problems which are not mentioned above can be clearly understood from the following description by those skilled in the art to which the present disclosure pertains.

Technical Solution

In one aspect, there is provided a method for performing, by a first user equipment (UE), a sidelink communication through a terminal-to-network relay operation in a wireless communication system, the method comprising transmitting, to a base station, a control message including indication information indicating whether a radio access technology (RAT) type of a radio interface section with a second UE is a 3GPP access or a non-3GPP access; receiving, from the base station, a radio resource for transmitting and receiving a signal with the second UE through the radio interface section; and transmitting and receiving the signal with the second UE based on the received radio resource, wherein the radio resource is configured based on the indication information.

If the indication information indicates that the RAT type of the radio interface section is the 3GPP access, the radio resource is a resource related to medium access control (MAC), radio link control (RLC) and packet data convergence protocol (PDCP) configuration. If the indication information indicates that the RAT type of the radio interface section is the non-3GPP access, the radio resource is a resource related to PDCP configuration only.

The control message is a NAS message or sidelinkUE-Information.

The first UE is a remote user equipment (UE) or a relay UE.

If the first UE is a remote UE, the second UE is a relay UE. The first UE is linked to the second UE.

The 3GPP access is long term evolution (LTE) or fifth generation (5G), and the non-3GPP access is Bluetooth or Wi-Fi.

A size of the indication information is 1 bit. If a value of the indication information is '1', the RAT type represents the 3GPP access. If a value of the indication information is '0', the RAT type represents the non-3GPP access.

In another aspect, there is provided a first user equipment (UE) performing a sidelink communication through a terminal-to-network relay operation in a wireless communication system, the first UE comprising a radio frequency (RF) module configured to transmit and receive a radio signal; and a processor functionally connected to the RF module, wherein the processor is configured to transmit, to a base station, a control message including indication information indicating whether a radio access technology (RAT) type of a radio interface section with a second UE is a 3GPP access or a non-3GPP access; receive, from the base station, a radio resource for transmitting and receiving a signal with the second UE through the radio interface section; and transmit and receive the signal with the second UE based on the received radio resource, wherein the radio resource is configured based on the indication information.

Advantageous Effects

The present disclosure can efficiently use radio resources and reduce latency for signal transmission/reception by transferring an indication of a RAT type of a radio interface section between a remote UE and a relay UE to thereby allocate, by a base station, resources of the radio interface section suitable for the RAT type to a UE.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 illustrates an example of a network structure of an evolved universal terrestrial radio access network (E-UTRAN) to which the present disclosure is applicable.

FIG. 2 illustrates structures of an E-UTRAN and an EPC in a wireless communication system to which the present disclosure is applicable.

FIG. 3 illustrates a radio interface protocol structure between a UE and an E-UTRAN in a wireless communication system to which the present disclosure is applicable.

FIG. 4 schematically illustrates a structure of a physical channel in a wireless communication system to which the present disclosure is applicable.

FIG. 5 illustrates a contention based random access procedure in a wireless communication system to which the present disclosure is applicable.

FIG. 6 illustrates an example of a procedure of transmitting and receiving sidelinkUEInformation.

FIG. 7 illustrates an example of a method for informing a base station of a sidelink RAT type proposed by the present disclosure.

FIG. 8 illustrates an example of a method for informing about a sidelink RAT type proposed by the present disclosure.

FIG. 9 is a flow chart illustrating another example of a method for informing about a sidelink RAT type proposed by the present disclosure.

FIG. 10 illustrates a block diagram of a wireless communication device according to an embodiment of the present disclosure.

FIG. 11 illustrates a block diagram of a communication device according to an embodiment of the present disclosure.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this disclosure, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A "base station (B S)" may be replaced with terms including a fixed station, a Node B, an evolved-nodeB (eNB), a base transceiver system (BTS), an access point (AP), a next generation NB, general NB, gNodeB (gNB), and the like. Further, a "terminal" may be fixed or mobile and may be replaced with terms including a mobile station (UE), a mobile station (MS), a user terminal (UT), a mobile subscriber station (MSS), a subscriber station (SS) advanced mobile station (WT), a wireless terminal (WT), a machine-type communication (MTC) device, a machine-to-machine (M2M) device, and a device-to-device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

FIG. 1 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 1, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 2 illustrates structures of an E-UTRAN and an EPC in a wireless communication system to which the present disclosure is applicable.

Referring to FIG. 2, an eNB may perform functions of selection of gateway (e.g., MME), routing to gateway during radio resource control (RRC) activation, scheduling and transmission of broadcast channel (BCH), dynamic resource allocation to the UE in uplink and downlink, and mobility control connection in LTE_ACTIVE state. As described above, the gateway in the EPC may perform functions of paging origination, LTE_IDLE state management, ciphering of user plane, bearer control of system architecture evolution (SAE), and ciphering and integrity protection of NAS signaling.

FIG. 3 illustrates a radio interface protocol structure between a UE and an E-UTRAN in a wireless communication system to which the present disclosure is applicable.

FIG. 3(a) illustrates a radio protocol structure of a control plane, and FIG. 3(b) illustrates a radio protocol structure of a user plane.

Referring to FIG. 3, layers of a radio interface protocol between the UE and the E-UTRAN may be classified into a first layer L1, a second layer L2, and a third layer L3 based on lower three layers of the open system interconnection (OSI) model that is well-known in a communication system technology field. The radio interface protocol between the UE and the E-UTRAN horizontally consists of a physical layer, a data link layer, and a network layer, and is vertically divided into a user plane which is a protocol stack for data information transmission and a control plane which is a protocol stack for transmission of a control signal.

The control plane refers to a path along which control messages used for the UE and the network to manage calls are sent. The user plane refers to a path along which data, for example, voice data or Internet packet data, etc. created in an application layer is transmitted. Each layer of the control plane and the user plane of the radio protocol will be described below.

The first layer, i.e., the physical layer (PHY) provides an information transfer service to an upper layer by using a physical channel. The physical layer is connected to a medium access control (MAC) layer located at an upper level via a transport channel, and data is transmitted between the MAC layer and the physical layer over the transport channel. The transport channel is classified depending on how and with what characteristics data are transmitted over a radio interface. Data is transmitted between different physical layers and between a physical layer of a transmitter end and a physical layer of a receiver end over a physical channel. The physical layer is modulated in an orthogonal frequency division multiplexing (OFDM) scheme and uses time and frequency as radio resources.

There are several physical control channels used in the physical layer. A physical downlink control channel (PDCCH) informs the UE about the resource allocation of a paging channel (PCH) and a downlink shard channel (DL-SCH) and hybrid automatic repeat request (HARQ) information related to an uplink shared channel (UL-SCH). Moreover, the PDCCH can carry an uplink grant that informs the UE about the resource allocation of uplink transmission. A physical control format indicator channel (PCFICH) informs the UE about the number of OFDM symbols used for the PDCCHs and is transmitted for each subframe. A physical HARQ indicator channel (PHICH) carries a HARQ acknowledge (ACK)/non-acknowledge (NACK) signal in response to uplink transmission. A physical uplink control channel (PUCCH) carries uplink control information such as HARQ ACK/NACK for downlink transmission, a scheduling request, and a channel quality indicator (CQI). A physical uplink shared channel (PUSCH) carries the UL-SCH.

The MAC layer of the second layer L2 provides services to a radio link control (RLC) layer, that is an upper layer of the MAC layer, over a logical channel. The MAC layer includes functions of mapping between the logical channel and the transport channel and multiplexing/demultiplexing for a transport block provided to a physical channel on a transport channel of a MAC service data unit (SDU) belonging to the logical channel.

The RLC layer of the second layer L2 supports reliable transmission of data. Functions of the RLC layer include concatenation, segmentation, and reassembly of the RLC SDU. To guarantee various quality of services (QoS) that a radio bearer (RB) requests, the RLC layer provides three operation modes: a transparent mode (TM), an unacknowledged mode (UM), and an acknowledge mode (AM). The AM RLC provides error correction through an automatic repeat request (ARQ). In case the MAC layer performs the RLC function, the RLC layer may be included as a functional block of the MAC layer.

A packet data convergence protocol (PDCP) layer of the second layer L2 performs functions of transfer of user data in the user plane, header compression, and ciphering. The header compression function refers to a function of reducing the IP packet header size that contains relatively large-sized and unnecessary control information, in order to allow Internet protocol (IP) packet such as Internet protocol version 4 (IPv4) or Internet protocol version 6 (IPv6) to be transmitted efficiently over a radio interface with a narrow bandwidth. A function of the PDCP layer in the control plane includes the transfer of control plane data and ciphering/integrity protection.

A radio resource control (RRC) layer located in the lowest part of the third layer L3 is defined only in the control plane. The RRC layer functions to control radio resources between the UE and the network. To this end, the UE and the network exchange RRC messages with each other via the RRC layer. The RRC layer controls a logical channel, a transport channel, and a physical channel related to configuration, re-configuration, and release of radio bearers. The radio bearer refers to a logical path provided by the second layer L2 for the purpose of data transmission between the UE and the network. Configuring the radio bearer means to define a radio protocol layer and characteristics of the channel for the purpose of providing a specific service and to configure each detailed parameter and operation method. The radio bearer may be again divided into a signaling RB (SRB) and a data RB (DRB). The SRB is used as a path for sending the RRC message in the control plan, and the DRB is used as a path for transmitting user data in the user plane.

A non-access stratum (NAS) layer located in the upper hierarchy of the RRC layer performs functions of session management, mobility management, and so on.

One cell constituting a base station is configured with one bandwidth among 1.25, 2.5, 5, 10, and 20 MHz and provides downlink or uplink transmission services to several UEs. The different cells may be configured to provide different bandwidths.

Examples of a downlink transport channel for transmitting data from the network to the UE include a broadcast channel (BCH) which transmits system information, a PCH which sends a paging message, and a DL-SCH which sends a user traffic or a control message. Downlink multicast or broadcast service traffic or a control message may be transmitted over the DL-SCH or over a separate downlink multicast channel (MCH). Examples of an uplink transport channel for transmitting data from the UE to the network include a random access channel (RACH) which sends an initial control message and an uplink shared channel (UL-SCH) which sends a user traffic or a control message.

A logical channel lies in the upper hierarchy of a transport channel and is mapped to the transport channel. A logical channel may be divided into a control channel for transmission of control area information and a traffic channel for transmission of user area information. Examples of the control channel include a broadcast control channel (BCCH), a paging control channel (PCCH), a common control channel (CCCH), a dedicated control channel (DCCH), and a multicast control channel (MCCH). Examples of the traffic channel include a dedicated traffic channel (DTCH) and a multicast traffic channel (MTCH). The PCCH is a downlink channel transferring paging information and is used when the network does not know a cell to which the UE belongs. The CCCH is used by a UE having no RRC connection with the network. The MCCH is a point-to-multipoint downlink channel which is used to transfer multimedia broadcast and multicast service (MBMS) control information from the network to the UE. The DCCH is a point-to-point bi-directional channel that is used by a UE having RRC connection transferring dedicated control information between the UE and the network. The DTCH is a point-to-point channel which is dedicated to one UE for transferring user information that can exist in uplink and downlink. The MTCH is a point-to-multipoint downlink channel for transmitting traffic data from the network to the UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 4 schematically illustrates a structure of a physical channel in a wireless communication system to which the present disclosure is applicable.

Referring to FIG. 4, the physical channel transfers signaling and data on radio resources consisting of one or more subcarriers in a frequency domain and one or more symbols in a time domain.

One subframe with 1.0 ms length consists of a plurality of symbols. Specific symbol(s) of the subframe (e.g., a first symbol of the subframe) may be used for PDCCH. The PDCCH carries information about dynamically allocated resources (e.g., resource block, modulation and coding scheme (MCS), etc.).

Random Access Procedure

A random access procedure provided by the LTE/LTE-A system is described below.

The random access procedure is performed when a UE performs initial access in an RRC idle state because it does not have RRC connection with a base station, when the UE performs an RRC connection re-establishment procedure, and so on.

The LTE/LTE-A system provides both a contention based random access procedure in which the UE randomly selects to use one preamble in a specific set, and a non-contention based random access procedure in which the base station uses a random access preamble that the base station allocates to only a specific UE, in a process of selecting a random access preamble (RACH preamble).

FIG. 5 illustrates a contention based random access procedure in a wireless communication system to which the present disclosure is applicable.

(1) First message (Msg 1, message 1)

First, a UE randomly selects one random access preamble (RACH preamble) from a set of random access preambles indicated through system information or a handover command, selects a physical RACH (PRACH) resource capable of transmitting the random access preamble, and transmits the selected PRACH resource.

A base station receiving the random access preamble from the UE decodes the random access preamble and obtains an RA-RNTI. The RA-RNTI related to the PRACH, to which the random access preamble is transmitted, is determined depending on time-frequency resources of the random access preamble transmitted by the corresponding UE.

(2) Second message (Msg 2, message 2)

The base station transmits, to the UE, a random access response addressed to the RA-RNTI obtained via the preamble on the first message. The random access response may include a random access (RA) preamble index/identifier, an uplink (UL) grant informing of uplink radio resources, a temporary cell-RNTI (TC-RNTI), and time alignment commands (TACs). The TAC is information indicating a time alignment command that the base station sends to the UE to maintain an uplink time alignment. The UE updates an uplink transmission timing using the TAC. When the UE updates a time alignment, the UE initiates or restarts a time alignment timer. The UL grant includes an uplink resource allocation and a transmit power command (TPC) that are used to send a scheduling message (third message) to be described later. The TPC is used to determine transmission power for a scheduled PUSCH.

After the UE transmits the random access preamble, the UE attempts to receive its own random access response within a random access response window that the base station indicates through system information or a handover command, detects a PDCCH masked with an RA-RNTI corresponding to the PRACH, and receives a PDSCH indicated by the detected PDCCH. Information about the random access response may be transmitted in the format of a MAC packet data unit (PDU), and the MAC PDU may be transferred via the PDSCH.

If the UE successfully receives a random access response having the same random access preamble index/identifier as the random access preamble that has been transmitted to the base station, the UE stops the monitoring of the random access response. On the other hand, if the UE does not receive a random access response message until the random access response window is terminated, or the UE does not receive a valid random access response having the same random access preamble index as the random access preamble that has been transmitted to the base station, the UE considers the reception of the random access response as a failure and then may perform preamble retransmission.

(3) Third message (Msg 3, message 3)

If the UE receives a random access response valid for itself, the UE processes each of information included in the random access response. That is, the UE applies a TAC and stores a TC-RNTI. Further, the UE transmits data stored in a buffer of the UE or newly generated data to the base station using the UL grant.

In case of a first connection of the UE, an RRC connection request that is generated in the RRC layer and is transferred via a CCCH may be included in the third message and transmitted. In case of an RRC connection re-establishment procedure, an RRC connection re-establishment request that is generated in the RRC layer and is transferred via a CCCH may be included in the third message and transmitted. Further, the third message may include an NAS access request message.

The third message should include an identifier of the UE. There are two methods for including the identifier of the UE in the third message. In a first method, if the UE already had a valid cell identifier (C-RNTI) allocated in a corresponding cell prior to the random access procedure, the UE transmits its own cell identifier through an uplink transmission signal corresponding to the UL grant. On the other hand, if a valid cell identifier was not allocated to the UE prior to a random access procedure, the UE transmits including its own unique identifier (e.g., S-TMSI (SAE temporary mobile subscriber identity) or random number). In general, the unique identifier is longer than a C-RNTI.

If the UE transmitted data corresponding to the UL grant, it initiates a contention resolution timer.

(4) Fourth message (Msg 4, message 4)

If the base station receives a C-RNTI of the corresponding UE from the UE through the third message, the base station sends a fourth message to the UE using the received C-RNTI. On the other hand, if the base station receives a unique identifier (i.e., S-TMSI or random number) from the UE through the third message, the base station sends the fourth message to the UE using a TC-RNTI allocated to the corresponding UE in a random access response. For example, the fourth message may include an RRC connection setup message.

The UE transmits data including its own identifier through the UL grant included in the random access response, and then waits for an instruction of the base station for a contention resolution. That is, the UE attempts to receive a PDCCH in order to receive a specific message. There are two methods for receiving the PDCCH. As described above, if the identifier of the UL in the third message transmitted corresponding to the UL grant is C-RNTI, the UE attempts to receive the PDCCH using its own C-RNTI, and if the identifier of the UL is a unique identifier (i.e., S-TMSI or random number), the UE attempts to receive the PDCCH using a TC-RNTI included in the random access response. Afterwards, in the former case, if the UE received the PDCCH through its own C-RNTI before the contention resolution timer expires, the UE determines that the random access procedure has been normally performed, and terminates the random access procedure. In the latter case, if the UE received the PDCCH through the TC-RNTI before the contention resolution timer expires, the UE checks data to which a PDSCH indicated by the PDCCH is transferred. If the unique identifier of the UE was included in contents of the data, the UE determines that the random access procedure has been normally performed, and terminates the random access procedure. The UE obtains the C-RNTI through the fourth message, and then the UE and a network transmit and receive a UE-dedicated message using the C-RNTI.

Unlike the contention based random access procedure illustrated in FIG. 5, the operation in the non-contention based random access procedure is terminated by only the transmission of the first message and the second message. That is, the UE is allocated a random access preamble from the base station before transmitting to the base station the random access preamble as the first message, transmits to the base station the allocated random access preamble as the first message, and receives a random access response from the base station, thereby terminating the random connection procedure.

Sidelink Communication Monitoring

FIG. 6 illustrates an example of a procedure of transmitting and receiving sidelinkUEInformation.

The purpose of this procedure is to inform the E-UTRAN that the UE is more interested or no longer interested to receive sidelink communication or discovery, not only request allocation or release of transmission resources for sidelink communication or discovery notification or V2X sidelink communication or sidelink discovery gap but also receive the V2X sidelink communication, and report parameters related to sidelink discovery from system information of inter-frequency/PLMN cell.

SidelinkUEInformation

A SidelinkUEInformation message is used for indication of sidelink information to the eNB.

The following Tables 1 and 2 represent an example of SidelinkUEInformation.

TABLE 1

```
-- ASN1START
SidelinkUEInformation-r12 ::=         SEQUENCE {
    criticalExtensions                CHOICE {
        c1                                CHOICE {
            sidelinkUEInformation-r12         SidelinkUEInformation-r12-IEs,
            spare3 NULL, spare2 NULL, spare1 NULL
        },
        criticalExtensionsFuture          SEQUENCE { }
    }
}
```

TABLE 1-continued

```
SidelinkUEInformation-r12-IEs ::=      SEQUENCE {
    commRxInterestedFreq-r12           ARFCN-ValueEUTRA-r9              OPTIONAL,
    commTxResourceReq-r12              SL-CommTxResourceReq-r12         OPTIONAL,
    discRxInterest-r12                 ENUMERATED {true}                OPTIONAL,
    discTxResourceReq-r12              INTEGER (1..63)                  OPTIONAL,
    lateNonCriticalExtension           OCTET STRING                     OPTIONAL,
    nonCriticalExtension               SidelinkUEInformation-v1310-IEs  OPTIONAL
}
SidelinkUEInformation-v1310-IEs ::=SEQUENCE {
    commTxResourceReqUC-r13            SL-CommTxResourceReq-r12         OPTIONAL,
    commTxResourceInfoReqRelay-r13         SEQUENCE {
        commTxResourceReqRelay-r13         SL-CommTxResourceReq-r12            OPTIONAL,
        commTxResourceReqRelayUC-r13       SL-CommTxResourceReq-r12            OPTIONAL,
        ue-Type-r13                        ENUMERATED {relayUE, remoteUE}
                                                                            OPTIONAL,
    }
    discTxResourceReq-v1310            SEQUENCE {
        carrierFreqDiscTx-r13          INTEGER (1..maxFreq)             OPTIONAL,
        discTxResourceReqAddFreq-r13   SL-DiscTxResourceReqPerFreqList-r13   OPTIONAL
    }                                                                   OPTIONAL,
    discTxResourceReqPS-r13            SL-DiscTxResourceReq-r13OPTIONAL,
    discRxGapReq-r13                   SL-GapRequest-r13                OPTIONAL,
    discTxGapReq-r13                   SL-GapRequest-r13                OPTIONAL,
    discSysInfoReportFreqList-r13      SL-DiscSysInfoReportFreqList-r13 OPTIONAL,
    nonCriticalExtension               SidelinkUEInformation-v14x0-IEs             OPTIONAL
}
SidelinkUEInformation-v14x0-IEs ::=SEQUENCE {
    v2x-CommRxInterestedFreq-r14       INTEGER (0..maxFreq)             OPTIONAL,
    v2x-CommTxResourceReq-r14              V2X-CommTxResourceRec-r14            OPTIONAL,
    nonCriticalExtension               SEQUENCE { }                     OPTIONAL
}
SL-CommTxResourceReq-r12 ::=           SEQUENCE {
    carrierFreq-r12                    ARFCN-ValueEUTRA-r9              OPTIONAL,
    destinationInfoList-r12            SL-DestinationInfoList-r12
}
V2X-CommTxResourceReq-r14 ::=          SEQUENCE {
    v2x-CommTxFreq-r14                 INTEGER (0..maxFreq)             OPTIONAL,
    v2x-DestinationInfoList-r14        SL-DestinationInfoList-r12       OPTIONAL
}
SL-DiscTxResourceReqPerFreqList-r13 ::=        SEQUENCE (SIZE (1..maxFreq)) OF SL-
DiscTxResourceReq-r13
SL-DiscTxResourceReq-r13 ::=           SEQUENCE {
    carrierFreqDiscTx-r13              INTEGER (1..maxFreq)             OPTIONAL,
    discTxResourceReq-r13              INTEGER (1..63)
}
SL-DestinationInfoList-r12 ::=   SEQUENCE (SIZE (1..maxSL-Dest-r12)) OF SL-DestinationIdentity-r12
SL-DestinationIdentity-r12 ::=   BIT STRING (SIZE (24))
SL-DiscSysInfoReportFreqList-r13 ::=           SEQUENCE (SIZE (1.. maxSL-DiscSysInfoReportFreq-r13)) OF
SL-DiscSysInfoReport-r13
-- ASN1STOP
```

TABLE 2

SidelinkUEInformation field descriptions carrierFreqDiscTx
Indicates the frequency by the index of the entry in field discInterFreqList within
SystemInformationBlockType19. Value 1 corresponds to the first entry in discInterFreqList
within SystemInformationBlockType19, value 2 corresponds to the second entry in this list
and so on.
commRxInterestedFreq
Indicates the frequency on which the UE is interested to receive sidelink communication.
commTxResourceReq
Indicates the frequency on which the UE is interested to transmit non-relay related sidelink
communication as well as the one-to-many sidelink communication transmission
destination(s) for which the UE requests E-UTRAN to assign dedicated resources.
commTxResourceReqRelay
Indicates the relay related one-to-many sidelink communication transmission destination(s) for
which the sidelink relay UE requests E-UTRAN to assign dedicated resources.
commTxResourceReqRelayUC
Indicates the relay related one-to-one sidelink communication transmission destination(s) for
which the sidelink relay UE or sidelink remote UE requests E-UTRAN to assign dedicated
resources i.e. either contains the unicast destination identity of the sidelink relay UE or of the
sidelink remote UE.
commTxResourceReqUC
Indicates the frequency on which the UE is interested to transmit non-relay related one-
to-one sidelink communication as well as the sidelink communication transmission
destination(s) for which the UE requests E-UTRAN to assign dedicated resources.

TABLE 2-continued

SidelinkUEInformation field descriptions destinationInfoList
Indicates the destination(s) for relay or non-relay related one-to-one or one-to-many sidelink
communication. For one-to-one sidelink communication the destination is identified by the
ProSe UE ID for unicast communication, while for one-to-many the destination it is identified
by the ProSe Layer-2 Group ID.
discRxInterest
Indicates that the UE is interested to monitor sidelink discovery announcements.
discSysInfoReportFreqList
Indicates, for one or more frequecies, a list of sidelink discovery related parameters acquired
from system Information of cells on configured inter-frequency carriers.
carrierFreqDiscTx
Indicates the frequency by the index of the entry in field discInterFreqList within
SystemInformationBlockType19. Value 1 corresponds to the first entry in discInterFreqList
within SystemInformationBlockType19, value 2 corresponds to the second entry in this list
and so on.
discTxResourceReq
Indicates the number of separate discovery message(s) the UE wants to transmit every
discovery period. This field concerns the resources the UE requires every discovery period for
transmitting sidelink discovery announcement(s).
discTxResourceReqAddFreq
Indicates, for any frequencies in addition to the one covered by discTxResourceReq, the
number of separate discovery message(s) the UE wants to transmit every discovery period.
This field concerns the resources the UE requires every discovery period for transmitting
sidelink discovery announcement(s).
discTxResourceReqPS
Indicates the number of separate PS related discovery message(s) the UE wants to transmit
every discovery period. This field concerns the resources the UE requires every discovery
period for transmitting PS related sidelink discovery announcement(s).
v2x-CommRxInterestedFreq
Indicates the index of the frequency on which the UE is interested to receive V2X sidelink
communication. The value 1 corresponds to the frequency of first entry in v2x-
InterFreqInfoList broadcast in SIB21, while the value 2 corresponds to the frequency of second
entry in v2x-InterFreqInfoList broadcast in SIB21 and so on. The value 0 corresponds the
Pcell's frequency,
v2x-CommTxFreq
Indicates the index of the frequency on which the UE is interested to transmit V2X sidelink
communication. The value 1 corresponds to the frequency of first entry in v2x-
InterFreqInfoList broadcast in SIB21, while the value 2 corresponds to the frequency of second
entry in v2x-InterFreqInfoList broadcast in SIB21 and so on. The value 0 corresponds the
Pcell's frequency,
v2x-DestinationInfoList
Indicates the destination(s) for V2X sidelink communication.

Next, sidelink communication monitoring is described.

A UE capable of sidelink communication that is configured by upper layers to receive sidelink communication:

1> if the conditions for sidelink communication operation are met:

2> if in coverage on the frequency used for sidelink communication:

3> if a cell chosen for sidelink communication reception broadcasts SystemInformationBlockType18 including commRxPool:

4> configures lower layers to monitor sidelink control information and corresponding data using the pool of resources indicated by commRxPool.

If commRxPool includes one or more entries including rxParametersNCell, the UE may monitor only such entries if associated primary synchronization signal (PSS)/secondary synchronization signal (SSS) or sidelink synchronization signal (SLSS) ID is detected. When monitoring such pool, the UE applies timing of the concerned PSS/SSS or SLSS.

2> Else, if out of coverage of the sidelink carrier (i.e., frequency used for sidelink communication):

3> the UE configures lower layers to monitor sidelink control information and the corresponding data using the pool of resources that were preconfigured.

The UE may monitor if the UE does not have a selected SyncRef UE in accordance with the timing of the selected SyncRef UE or based on the UE's own timing.

Sidelink Communication Transmission

A UE capable of sidelink communication that is configured by upper layers to transmit non-relay related sidelink communication and has related data to be transmitted, or a UE capable of relay related sidelink communication that is configured by upper layers to transmit relay related sidelink communication and satisfies the conditions for relay related sidelink communication:

1> if the conditions for sidelink communication operation are met:

2> if in coverage on the frequency used for sidelink communication:

3> if the UE is in an RRC_CONNECTED state and uses the PCell for sidelink communication:

4> if the UE is configured, by the current PCell/the PCell in which a physical layer problem or a radio link failure was detected, with scheduled commTxResources:

5> if T310 or T311 is running; and if the PCell at which the UE detected the physical layer problem or the radio link failure broadcasts SystemInformationBlockType18 including commTxPoolExceptional; or 5> if T301 is running and the cell on which the UE initiates connection re-establishment broadcasts SystemInformationBlockType18 including commTxPoolExceptional:

6> configures lower layers to transmit sidelink control information and corresponding data using the pool of resources indicated by a first entry in commTxPoolExceptional;

5> else:
6> configures lower layers to request E-UTRAN to assign transmission resources for sidelink communication;
4> else if the UE is configured with commTxPoolNormalDedicated or commTxPoolNormalDedicatedExt:
5> if priorityList is included for the entries of commTxPoolNormalDedicated or commTxPoolNormalDedicatedExt:
6> configures lower layers to transmit the sidelink control information and the corresponding data using the one or more pools of resources indicated by commTxPoolNormalDedicated or commTxPoolNormalDedicatedExt i.e. indicates all entries of this field to lower layers;
5> else:
6> configures lower layers to transmit the sidelink control information and the corresponding data using the pool of resources indicated by the first entry in commTxPoolNormalDedicated;
3> else (i.e. sidelink communication in RRC_IDLE or on cell other than PCell in RRC_CONNECTED):
4> if the cell chosen for sidelink communication transmission broadcasts SystemInformationBlockType18:
5> if SystemInformationBlockType18 includes commTxPoolNormalCommon:
6> if priorityList is included for the entries of commTxPoolNormalCommon or commTxPoolNormalCommonExt:
7> configures lower layers to transmit the sidelink control information and the corresponding data using the one or more pools of resources indicated by commTxPoolNormalCommon and/or commTxPoolNormalCommonExt, i.e., indicates all entries of these fields to lower layers;
6> else:
7> configures lower layers to transmit the sidelink control information and the corresponding data using the pool of resources indicated by the first entry in commTxPoolNormalCommon;
5> else if SystemInformationBlockType18 includes commTxPoolExceptional:
6> from the moment the UE initiates connection establishment until receiving an RRCConnectionReconfiguration including sl-CommConfig or until receiving an RRCConnectionRelease or an RRCConnectionReject;
7> configures lower layers to transmit the sidelink control information and the corresponding data using the pool of resources indicated by the first entry in commTxPoolExceptional;
2> else (i.e. out of coverage on sidelink carrier):
3> if priorityList is included for the entries of preconfigComm in SL-Preconfiguration:
4> configures lower layers to transmit the sidelink control information and the corresponding data using the one or more pools of resources indicated by preconfigComm, i.e., indicates all entries of this field to lower layers and in accordance with the timing of the selected SyncRef UE, or if the UE does not have a selected SyncRef UE, based on the UEs own timing;
3> else:
4> configures lower layers to transmit the sidelink control information and the corresponding data using the pool of resources that were preconfigured.

The conditions for relay related sidelink communication are as follows.
1> if the transmission concerns sidelink relay communication; and the UE is capable of sidelink relay or sidelink remote operation:
2> if the UE is in RRC_IDLE; and if the UE has a selected sidelink relay UE: the UE configures lower layers to transmit the sidelink control information and the corresponding data using the specific resources, only if the following condition is met:
3> if the sidelink remote UE threshold conditions are met; and if the UE configured lower layers with a pool of resources included in SystemInformationBlockType18 (e.g., commTxPoolNormalCommon, commTxPoolNormalCommonExt or commTxPoolExceptional); commTxAllowRelayCommon is included in SystemInformationBlockType 18;
2> if the UE is in RRC_CONNECTED: the UE configures lower layers to transmit the sidelink control information and the corresponding data using the specific resources, only if the following condition is met:
3> if the UE configured lower layers with resources provided by dedicated signalling (i.e., commTxResources); the UE is configured with commTxAllowRelayDedicated set to 'true'.

A method for informing a base station about an indication for a sidelink RAT type in a sidelink section proposed by the present disclosure is described in detail below with reference to related figures.

First, a background required for the method proposed by the present disclosure is briefly mentioned.

The technology for a sidelink relay operation involves UE-to-network relay over 3GPP access or non-3GPP access (e.g., using Wi-Fi, Bluetooth, etc.).

The sidelink may refer to a link between a remote UE and a relay UE.

The remote UE may be connected to a network via the relay UE. That is, if the remote UE uses a sidelink relay operation, data may be relayed by the relay UE.

Based on L2 relay, the eNB should store both UE contexts (e.g., RRC) of the relay UE and the remote UE.

Thus, the remote UE may establish either direct connection (i.e., Uu interface with the eNB) or indirect connection (i.e., PC5 interface with the relay UE) and transmit data.

After a bearer configuration for the remote UE is completed, sidelink transmission/reception is performed in configuration resources allocated by the eNB.

Based on a sidelink bearer type (e.g., DRB for the 3GPP access and radio bearer for the non-3GPP access), a resource configuration method should be differently applied by the eNB.

However, a method in which the eNB is able to identify a type of a sidelink bearer is not currently defined.

In summary, a sidelink operation that has been recently discussed in further enhanced D2D (FeD2D) has considered the non-3GPP access (e.g., Wi-Fi, Bluetooth) as well as the 3GPP access for the sidelink section.

Thus, it is necessary to determine so that the base station, to which the relay UE linked to the remote UE is connected, performs a resource allocation for the sidelink transmission and/or reception and MAC/RLC configuration considering the sidelink RAT type of the sidelink section.

However, as described above, in an existing sidelink operation, a method for allowing the base station to be able to know the sidelink RAT type of the sidelink section is not defined.

A method for informing the base station about an indication for the sidelink RAT type in the sidelink section proposed by the present disclosure is described.

First, a remote UE performs a D2D discovery procedure with a relay UE (or neighboring UE(s)).

Hence, PC5 connection (or sidelink) can be configured with the remote UE and the relay UE.

Afterwards, it is assumed that the remote UE has a relation with the corresponding relay UE so that the remote UE is connected to the network.

Afterwards, the remote UE may transmit or receive data to or from the network via the relay UE.

Here, the remote UE or the relay UE may transmit an indication for a sidelink RAT type to the eNB using a NAS message (e.g., a service request message or RRC message), sidelink information (e.g., sidelinkUEInformation), etc.

Hence, the eNB can identify a RAT type of a sidelink connection and apply different radio resource configurations to the remote UE depending on the identified RAT type.

FIG. 7 illustrates an example of a method for informing a base station of a sidelink RAT type proposed by the present disclosure.

Referring to FIG. 7, a remote UE or a relay UE linked to the remote UE may transmit, to a base station, information on a sidelink RAT type of a sidelink section in S710.

Next, the base station checks whether the received sidelink RAT type is a sidelink of 3GPP access type or a sidelink of non-3GPP access type, in S720.

If the received sidelink RAT type is the sidelink of 3GPP access type, an eNB configures MAC/RLC/PDCP resources as resources for sidelink transmission and/or reception, in S730.

If the received sidelink RAT type is the sidelink of non-3GPP access type, the eNB configures PDCP resource only as resources for sidelink transmission and/or reception, in S740. That is, the eNB does not perform resource configuration for MAC/RLC.

Specifically, a method for informing the base station about the sidelink RAT type of the sidelink section can be performed through (1) SidelinkUEInformation transmission by the remote UE (Method 2), (2) NAS message transmission by the relay UE linked to the remote UE (Method 1), and (3) SidelinkUEInformation transmission by the relay UE linked to the remote UE (Method 3).

The methods 1 to 3 above are illustrated in FIG. 8. That is, FIG. 8 illustrates an example of a method for informing about a sidelink RAT type proposed by the present disclosure.

That is, S810 represents the method 2, S820 represents the method 1, and S830 represents the method 3.

Here, an indication (or indicator) of a sidelink RAT type may be used to distinguish between 3GPP (LTE access) and non-3GPP (Wi-Fi, Bluetooth).

As above, by transmitting the indication of the sidelink RAT type to the eNB, the eNB can identify sidelink RAT types for remote UEs linked to a relay UE.

Hence, the eNB can reduce latency for data transmission/reception by avoiding unnecessary configuration for MAC/RLC That is, the eNB does not configure resources for sidelink transmission and/or reception to the remote UEs with a sidelink of non-3GPP access type and configures only the PDCP.

Methods (methods 1 to 3) for transmitting an indication of the sidelink RAT type to the eNB are described below in more detail.

(Method 1)

Method 1 is to transmit, by a remote UE, an indication for a sidelink radio access technology (RAT) type to a base station by a NAS message.

That is, the method 1 describes a step in which the remote UE is in an idle state and attempts to connect to a network through RRC connected to a relay UE.

First, the remote UE sends the NAS message, e.g., a service request to the network via the relay UE.

The NAS message contains RAT type information of sidelink identified by the relay UE. That is, the relay UE forwards, to a MME related to its serving base station, the NAS message together with an RAT type indication of scheduled sidelink connection.

Next, the MME transmits a context of the remote UE to the eNB in order to setup a bearer directing the remote UE via the relay UE.

Next, the eNB may perform one of the following two operations after receiving the context of the remote UE.

The first operation is that the eNB configures resources, e.g., MAC/RLC/PDCP for the remote UE if a RAT type of sidelink connection is 3GPP access.

The second operation is that the eNB does not configure resource for the remote UE if the RAT type of sidelink connection is non-3GPP access.

That is, in case of the non-3GPP sidelink connection, the eNB does not configure RLC/MAC of the remote UE and configures only the PDCP of the remote UE located at an adaptation layer.

This reason is that the PHY/MAC configuration for the non-3GPP access is beyond a range of 3GPP.

Moreover, for the resource configuration, the eNB does not consider a method for allocating resources to the remote UE with the non-3GPP sidelink connection from sidelink Tx/Rx resource pool (e.g., considering that the bearer is established).

(Method 2)

Method 2 is to transmit, by a remote UE, an indication for a sidelink RAT type to a base station by sidelinkUEInformation.

That is, the method 2 describes a procedure in which the remote UE is connected and attempts to connect to a network through RRC connected to a relay UE.

First, the remote UE transmits the sidelinkUEInformation to the network via the relay UE.

This contains RAT type information of sidelink identified by the relay UE. That is, the relay UE forwards, to a MME related to its serving base station, the sidelinkUEInformation together with an RAT type indication of scheduled sidelink connection.

Next, the MME transmits a context of the remote UE to the eNB in order to setup a bearer directing the remote UE via the relay UE.

Next, the eNB may perform one of the following two operations after receiving the context of the remote UE.

The first operation is that the eNB configures resources, e.g., MAC/RLC/PDCP for the remote UE if a RAT type of sidelink connection is 3GPP access.

The second operation is that the eNB does not configure resource for the remote UE if the RAT type of sidelink connection is non-3GPP access.

That is, in case of the non-3GPP sidelink connection, the eNB does not configure RLC/MAC of the remote UE and configures only the PDCP of the remote UE located at an adaptation layer.

This reason is that the PHY/MAC configuration for the non-3GPP access is beyond a range of 3GPP.

Moreover, for the resource configuration, the eNB does not consider a method for allocating resources to the remote UE with the non-3GPP sidelink connection from sidelink Tx/Rx resource pool (e.g., considering that the bearer is established).

(Method 3)

Method 3 is to transmit, by a relay UE, an indication for a sidelink RAT type to a base station by sidelinkUEInformation.

That is, the method 3 describes a procedure in which a remote UE is connected and attempts to connect to a network through RRC connected to the relay UE.

First, the relay UE transmits the sidelinkUEInformation to the network.

This contains RAT type information of sidelink identified by the relay UE. That is, the relay UE forwards, to a MME related to its serving base station, the sidelinkUEInformation together with the indication of the RAT type of scheduled sidelink connection.

When the remote UE requests to establish link with the relay UE, the relay UE transmits the idelinkUEInformation.

Next, the eNB may perform one of the following two operations after receiving a message in a previous step.

The first operation is that the eNB configures resources, e.g., MAC/RLC/PDCP for the remote UE if the RAT type of sidelink connection is 3GPP access.

The second operation is that the eNB does not configure resource for the remote UE if the RAT type of sidelink connection is non-3GPP access.

That is, in case of the non-3GPP sidelink connection, the eNB does not configure RLC/MAC of the remote UE and configures only the PDCP of the remote UE located at an adaptation layer.

This reason is that the PHY/MAC configuration for the non-3GPP access is beyond a range of 3GPP.

Moreover, for the resource configuration, the eNB does not consider a method for allocating resources to the remote UE with the non-3GPP sidelink connection from sidelink Tx/Rx resource pool (e.g., considering that the bearer is established).

In the methods mentioned above, the RAT type of sidelink may be 3GPP/non-3GPP or LTE/WLAN/Bluetooth.

The indication for the sidelink RAT type can distinguish two RAT types (e.g., 3GPP (LTE) or non-3GPP (WLAN, Bluetooth)).

For example, the indication of the sidelink RAT type may be an indication parameter of 1 bit size that may be piggybacked within the NAS message.

If a value of the RAT type indication of 1 bit size is '1', it may mean 3GPP access, and if a value of the RAT type indication of 1 bit size is '0', it may mean non-3GPP access.

FIG. 9 is a flow chart illustrating another example of a method for informing about a sidelink RAT type proposed by the present disclosure.

First, a first UE sends, to a base station, a control message including indication information indicating whether a radio access technology (RAT) type of a radio interface section with a second UE is 3GPP access or non-3GPP access, in S910.

If the indication information indicates that the RAT type of the radio interface section is the 3GPP access, radio resources may be resources related to medium access control (MAC), radio link control (RLC) and packet data convergence protocol (PDCP) configuration. If the indication information indicates that the RAT type of the radio interface section is the non-3GPP access, the radio resource may be resources related to PDCP configuration only.

A size of the indication information is 1 bit. The RAT type may represent the 3GPP access if a value of the indication information is '1', and the RAT type may represent the non-3GPP access if a value of the indication information is '0'.

The control message may be a NAS message or sidelinkUEInformation.

The first UE may be a remote user equipment (UE) or a relay UE.

If the first UE is the remote UE, the second UE may be the relay UE. The first UE may be linked to the second UE.

The 3GPP access may be long term evolution (LTE) or fifth generation (5G), and the non-3GPP access may be Bluetooth or Wi-Fi.

Afterwards, the first UE receives, from the base station, a radio resource for transmitting and receiving a signal with the second UE through the radio interface section in S920.

Here, the radio resource may be configured based on the indication information.

Afterwards, the first UE transmits and receives the signal with the second UE based on the received radio resource in S930.

Overview of Devices to which the Present Disclosure can be Applied

FIG. 10 illustrates a block diagram of a wireless communication device according to an embodiment of the present disclosure.

Referring to FIG. 10, a wireless communication system includes a base station (or a network) 1010 and a UE 1020.

The base station 1010 includes a processor 1011, a memory 1012, and a communication module 1013.

The processor 1011 implements the functions, processes and/or methods proposed in FIGS. 1 to 9 above. Layers of wired/wireless interface protocol may be implemented by the processor 1011. The memory 1012, being connected to the processor 1011, stores various types of information for driving the processor 1011. The communication module 1013, being connected to the processor 1011, transmits and/or receives wired/wireless signals.

The communication module 1013 may include a radio frequency unit for transmitting/receiving a radio signal.

The UE 1020 includes a processor 1021, a memory 1022, and a communication module (or a RF unit) 1023. The processor 1021 implements the functions, processes and/or methods proposed in FIGS. 1 to 9 above. Layers of a wireless interface protocol may be implemented by the processor 1021. The memory 1022, being connected to the processor 1021, stores various types of information for driving the processor 1021. The communication module 1023, being connected to the processor 1021, transmits and/or receives wireless signals.

The memory 1012, 1022 can be installed inside or outside the processor 1011, 1021 and connected to the processor 1011, 1021 through various well-known means.

In addition, the base station 1010 and/or the UE 1020 can have a single antenna or multiple antennas.

FIG. 11 illustrates a block diagram of a communication device according to an embodiment of the present disclosure.

Particularly, FIG. 11 illustrates the UE of FIG. 10 in more detail.

Referring to FIG. 11, the UE includes a processor (or digital signal processor (DSP)) 1110, an RF module (or RF unit) 1135, a power management module 1105, an antenna 1140, a battery 1155, a display 1115, a keypad 1120, a memory 1130, a Subscriber Identification Module (SIM) card 1125 (which may be optional), a speaker 1145 and a microphone 1150. The UE may include a single antenna or multiple antennas.

The processor 1110 may be configured to implement the functions, processes and/or methods proposed in FIGS. 1 to 9 above. Layers of a wireless interface protocol may be implemented by the processor 1110.

The memory 1130 is connected to the processor 1110 and stores information related to operations of the processor 1110. The memory 1130 may be located inside or outside the processor 1110 and may be connected to the processors 1110 through various well-known means.

A user enters command information, such as a telephone number, for example, by pushing (or touching) the buttons of a keypad 1120 or by voice activation using the microphone 1150. The processor 1110 receives the command information and processes to perform the appropriate function, such as to dial the telephone number. Operational data may be extracted from the SIM card 1125 or the memory 1130. Furthermore, the processor 1110 may display the command and operational information on the display 1115 for the user's recognition and convenience.

The RF module 1135 is connected to the processor 1110, transmits and/or receives an RF signal. The processor 1110 forwards the command information to the RF module 1135, to initiate communication, for example, to transmit wireless signals comprising voice communication data. The RF module 1135 is comprised of a receiver and a transmitter for receiving and transmitting wireless signals. The antenna 1140 functions to transmit and receive wireless signals. Upon receiving the wireless signals, the RF module 1135 can forward the signal for processing by the processor 1110 and convert the signal to baseband. The processed signals may be converted into audible or readable information output via the speaker 1145.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. Order of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

Although a method for performing a sidelink communication in a wireless communication system according to the present disclosure has been described focusing on examples applying to the 3GPP LTE/LTE-A system and the 5G system, it can be applied to various wireless communication systems other than the systems.

The invention claimed is:

1. A method for performing, by a first user equipment (UE), a sidelink communication through a terminal-to-network relay operation in a wireless communication system, the method comprising:
    configuring a sidelink with a second UE by performing a device to device (D2D) discovery procedure;
    transmitting, to a base station, a control message including indication information indicating whether a radio access technology (RAT) type of the configured sidelink with the second UE is a 3GPP access or a non-3GPP access;
    receiving, from the base station, a radio resource for transmitting and receiving a signal with the second UE through the sidelink; and
    transmitting and receiving the signal with the second UE based on the received radio resource,
    wherein the radio resource is configured differently for (i) a case where the indication information indicates the RAT type of the sidelink as the 3GPP access and (ii) a case where the indication information indicates the RAT type of the sidelink as the non-3GPP access,
    wherein for the case where the indication information indicates that the RAT type of the sidelink is the 3GPP access, the radio resource is a resource related to medium access control (MAC), radio link control (RLC) and packet data convergence protocol (PDCP) configuration, and
    wherein for the case where the indication information indicates that the RAT type of the sidelink is the non-3GPP access, the radio resource is a resource related to PDCP configuration only.

2. The method of claim 1, wherein the control message is a non-access stratum (NAS) message or sidelinkUEInformation.

3. The method of claim 1, wherein the first UE is a remote user equipment (UE) or a relay UE.

4. The method of claim 1, wherein based on the first UE being a remote UE, the second UE is a relay UE,
    wherein the first UE is linked to the second UE.

5. The method of claim 1, wherein the 3GPP access is long term evolution (LTE) or fifth generation (5G),
    wherein the non-3GPP access is Bluetooth or Wi-Fi.

6. The method of claim 1, wherein a size of the indication information is 1 bit,
    wherein based on a value of the indication information being equal to '1', the RAT type represents the 3GPP access, wherein based on a value of the indication information being equal to '0', the RAT type represents the non-3GPP access.

7. A first user equipment (UE) configured to perform a sidelink communication through a terminal-to-network relay operation in a wireless communication system, the first UE comprising:
   a radio frequency (RF) module configured to transmit and receive a radio signal; and
   a processor functionally connected to the RF module,
   wherein the processor is configured to:
   configure a sidelink with a second UE by performing a device to device (D2D) discovery procedure;
   transmit, to a base station, a control message including indication information indicating whether a radio access technology (RAT) type of the configured sidelink with the second UE is a 3GPP access or a non-3GPP access;
   receive, from the base station, a radio resource for transmitting and receiving a signal with the second UE through the sidelink; and
   transmit and receive the signal with the second UE based on the received radio resource,
   wherein the radio resource is configured differently for (i) a case where the indication information indicates the RAT type of the sidelink as the 3GPP access and (ii) a case where the indication information indicates the RAT type of the sidelink as the non-3GPP access,
   wherein for the case where the indication information indicates that the RAT type of the sidelink is the 3GPP access, the radio resource is a resource related to medium access control (MAC), radio link control (RLC) and packet data convergence protocol (PDCP) configuration, and
   wherein for the case where the indication information indicates that the RAT type of the sidelink is the non-3GPP access, the radio resource is a resource related to PDCP configuration only.

8. A non-transitory computer-readable storage medium storing instructions that, based on being executed by a processor, control a first user equipment (UE) to perform operations for a sidelink communication through a terminal-to-network relay operation in a wireless communication system, the operations comprising:
   configuring a sidelink with a second UE by performing a device to device (D2D) discovery procedure;
   transmitting, to a base station, a control message including indication information indicating whether a radio access technology (RAT) type of the configured sidelink with the second UE is a 3GPP access or a non-3GPP access;
   receiving, from the base station, a radio resource for transmitting and receiving a signal with the second UE through the sidelink; and
   transmitting and receiving the signal with the second UE based on the received radio resource,
   wherein the radio resource is configured differently for (i) a case where the indication information indicates the RAT type of the sidelink as the 3GPP access and (ii) a case where the indication information indicates the RAT type of the sidelink as the non-3GPP access,
   wherein for the case where the indication information indicates that the RAT type of the sidelink is the 3GPP access, the radio resource is a resource related to medium access control (MAC), radio link control (RLC) and packet data convergence protocol (PDCP) configuration, and
   wherein for the case where the indication information indicates that the RAT type of the sidelink is the non-3GPP access, the radio resource is a resource related to PDCP configuration only.

* * * * *